(12) United States Patent  (10) Patent No.: US 9,235,017 B1
Meadowcroft et al.  (45) Date of Patent: Jan. 12, 2016

(54) FIBER OPTIC TRANSCEIVER WITH A HEAT DISSIPATING STRUCTURE

(71) Applicant: Avago Technologies General IP (Singapore) Pte. Ltd., Singapore (SG)

(72) Inventors: David Meadowcroft, San Jose, CA (US); Seng-Kum Chan, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/504,339

(22) Filed: Oct. 1, 2014

(51) Int. Cl.
  *G02B 6/42* (2006.01)
  *H04B 10/25* (2013.01)
  *H04B 10/40* (2013.01)

(52) U.S. Cl.
  CPC ............ *G02B 6/4269* (2013.01); *G02B 6/4273* (2013.01); *G02B 6/4274* (2013.01); *H04B 10/2504* (2013.01); *H04B 10/40* (2013.01)

(58) Field of Classification Search
  None
  See application file for complete search history.

(56) References Cited

U.S. PATENT DOCUMENTS

| | | | |
|---|---|---|---|
| 6,749,448 B2 | 6/2004 | Bright et al. | |
| 6,937,824 B2 * | 8/2005 | Watanabe | G02B 6/4201 385/88 |
| 8,644,712 B2 | 2/2014 | Chan et al. | |
| 2005/0265671 A1 | 12/2005 | Ono et al. | |
| 2010/0232800 A1 * | 9/2010 | Meadowcroft | G02B 6/4246 398/139 |
| 2014/0049965 A1 | 2/2014 | Aanegola et al. | |
| 2014/0125213 A1 | 5/2014 | Kong et al. | |

OTHER PUBLICATIONS

Elliot, Rod, "ESP—Heatsink design and transistor mounting: The Design of Heatsinks", http://sound.westhost.com/heatsinks.htm#s11.1, Aug. 14, 2014, 32 pages.
Kordyban, Tony, "Everything You Know Is Wrong Apr. 2001", http://tonykordyban.com/?page_id=209, Aug. 14, 2014, 5 pages.

\* cited by examiner

*Primary Examiner* — Ryan Lepisto
*Assistant Examiner* — Erin Chiem

(57) ABSTRACT

A fiber optic transceiver comprising a substrate, a heat dissipating structure, a receptacle and a light source is disclosed. The substrate may have a hole extending therethrough. The heat dissipating structure may be coupled to the substrate and may comprise a major surface, a plurality of fins, a projecting member, and a plurality of insulating protrusions. The plurality of fins may project from the major surface of the heat dissipating structure away from the substrate. The projecting member may extend partially or completely through the hole of the substrate. The plurality of insulating protrusions may extend substantially perpendicularly from the major surface of the heat dissipating structure and coupled to the substrate. The plurality of insulating protrusions may be configured to separate the major surface of the heat dissipating structure with the substrate so as to reduce heat transfer between the substrate and the heat dissipating structure.

20 Claims, 13 Drawing Sheets

FIBER OPTIC TRANSCEIVER WITH A HEAT DISSIPATING STRUCTURE

BACKGROUND

The demand for high-speed communication is ever increasing. Video on demand, high definition television, and video conferencing are some of the examples of applications that drive the demand for high-speed communication systems.

Increasing adoption of cloud computing by businesses further intensifies the need for the communication system to expand its bandwidth capacity. This demand pushes for a greater adoption for optical fiber networks not only for longer distance applications, but also for other applications that are traditionally performed by copper-based communication networks.

In an optical fiber network, a semiconductor light source is utilized to deliver optical signals over an optical fiber. While using the semiconductor light source provides a clear cost and operational efficiency advantage as compared to other light sources, some challenges may remain—in particular in the thermal management of the semiconductor light source

BRIEF DESCRIPTION OF THE DRAWINGS

Illustrative embodiments by way of examples, not by way of limitation, are illustrated in the drawings. Throughout the description and drawings, similar reference numbers may be, but not necessarily, used to identify similar elements. The drawings are for illustrative purpose to assist understanding and may not be drawn per actual scale.

DETAILED DESCRIPTION

Figure 1:
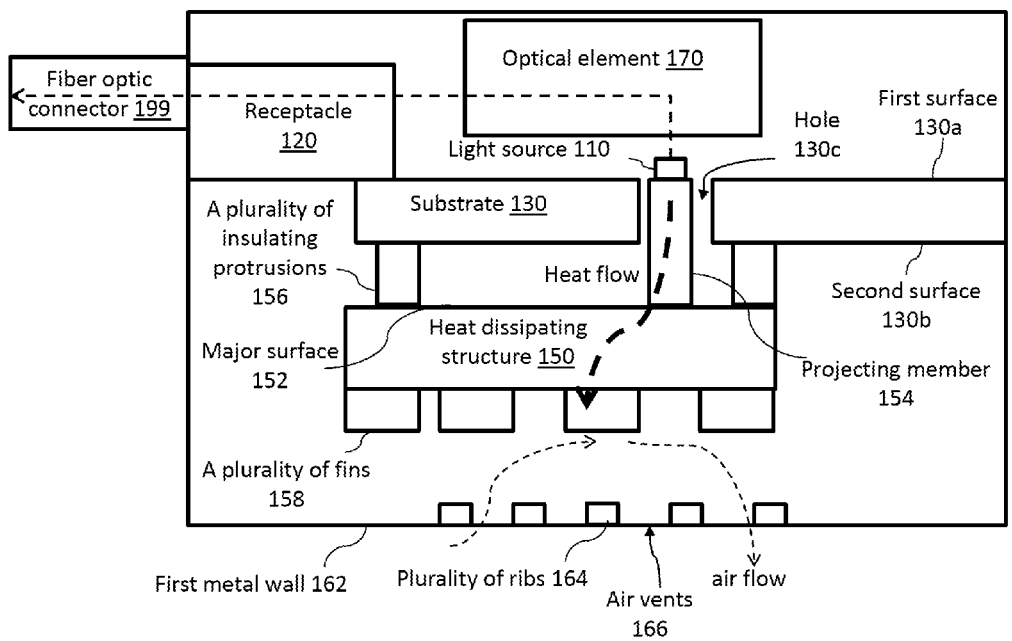
FIG. 1 illustrates a block diagram of a fiber optic transceiver.

FIG. 1 illustrates a block diagram of a fiber optic transceiver 100. The fiber optic transceiver 100 may comprise a substrate 130, one or more heat dissipating structures 150, a receptacle 120, a light source 110, and an optical element 170.

The substrate 130 may be a printed circuit board, as an example. The substrate 130 may comprise a hole 130c extending therethrough. It should be appreciated that the hole 130c may alternatively be referred to as a via or any other term used to describe a void of material extending through the substrate 130. The substrate 130 may comprise a first surface 130a and a second surface 130b. The second surface 130b may be opposite the first surface 130a. The hole 130c may extend completely through from the second surface 130b to the first surface 130a.

The heat dissipating structure 150 may be coupled to the substrate 130. The heat dissipating structure(s) 150 may comprise a major surface 152, a plurality of fins 158, a projecting member 154, and a plurality of insulating protrusions 156. The heat dissipating structure(s) 150 may be made from copper or aluminum or any other material that is capable of dissipating or conducting heat effectively. The heat dissipating structure(s) 150 may be integrally formed.

The major surface 152 of the heat dissipating structure(s) 150 may be disposed adjacent to the second surface 130b of the substrate 130. In some embodiments, the heat dissipating structure(s) 150 may be in direct physical contact with the second surface 130b via the plurality of insulating protrusions 156. The major surface 152 of the heat dissipating structure(s) 150 may be disposed parallel to the second surface 130b of the substrate 130. The plurality of fins 158 may be projecting from the major surface 152 away from the substrate 130. The projecting member 154 of the heat dissipating structure(s) 150 may extend through the hole 130c of the substrate 130. The projecting member 154 may be extending partially or completely through the hole 130c from the second surface 130b of the substrate 130 to the first surface 130a of the substrate 130.

The fiber optic transceiver 100 may further comprise a first metal wall 162. The first metal wall 162 may be disposed facing the second surface 130b of the substrate 130. The first metal wall 162 may comprise a plurality of ribs 164. Each of the plurality of ribs 164 may be distanced apart from one another so as to create air vents 166 on the first metal wall 162.

The light source 110 may be optically coupled with the receptacle 120. The light source 110 may be disposed on the projecting member 154 of the heat dissipating structure 150. The light source 110 may be disposed on the projecting member 154 adjacent to the first surface 130a of the substrate 130. In one embodiment, the light source 110 may be a distributed feedback laser (DFB laser). In another embodiment, the light source 110 may be a Vertical Cavity Surface Emitting Laser (VCSEL), an edge-emitting laser such as Fabry Perot (FP) laser, an LED or any other type of solid-state light source.

The heat dissipating structure 150 may be configured to dissipate heat generated by the light source 110. The plurality of fins 158 of the heat dissipating structure 150 may be disposed approximating the plurality of ribs 164 so as to provide cooling through an airflow that goes through the air vents 166.

The plurality of insulating protrusions 156 may be extending substantially perpendicularly from the major surface 152 of the heat dissipating structure 150. The plurality of insulating protrusions 156 may be coupled to the substrate 130. The plurality of insulating protrusions 156 may be configured to separate the major surface 152 of the heat dissipating structure 150 with the substrate 130 so as to reduce heat transfer between the substrate 130 and the heat dissipating structure 150. The plurality of insulating protrusions 156 may be coupled to the substrate 130 with a thermally insulating attachment member.

The receptacle 120 may be disposed adjacent to the substrate 130. The receptacle 120 may be configured to receiver a fiber optic connector 199. The receptacle 120 may be configured to receive an LC type fiber optic connector or an SC type fiber optic connector or other type of fiber optic connectors. The receptacle 120 may be optically coupled with the optical element 170 and the light source 110. The optical element 170 may be configured to direct light emitted from the light source 110 to the receptacle 120. The optical element 170 may be a mirror or a lens or any other optical component that is capable of directing light emitted from the light source 110 to the receptacle 120.

Figure 2A:
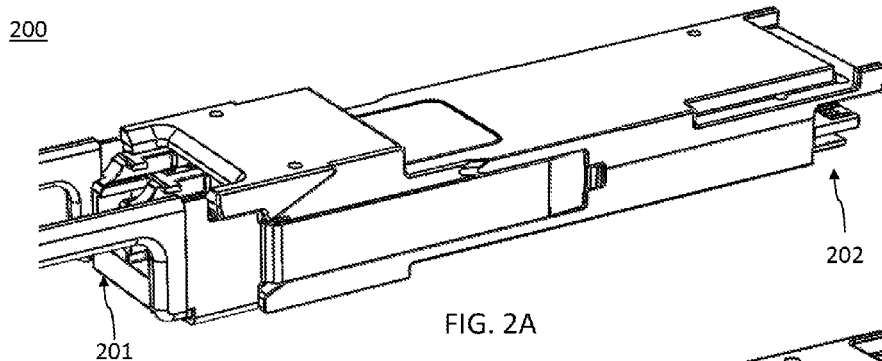
FIG. 2A illustrates a perspective view of a fiber optic transceiver.
Figure 2B:
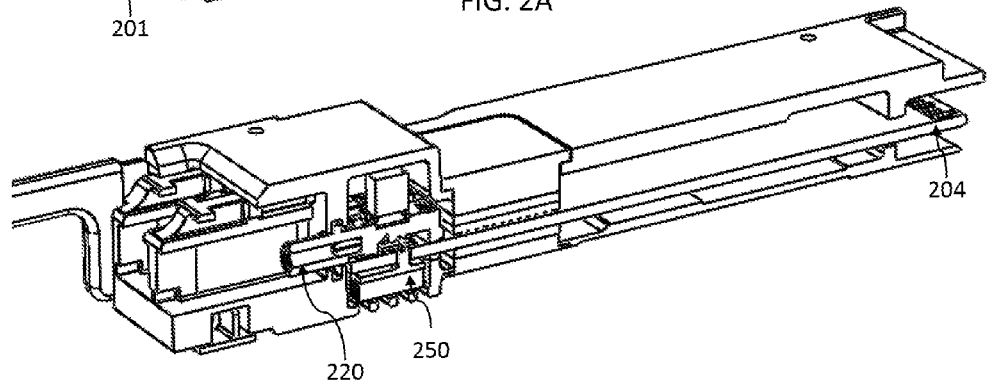
FIG. 2B illustrates a perspective sectional view of the fiber optic transceiver in FIG. 2A.
Figure 2C:
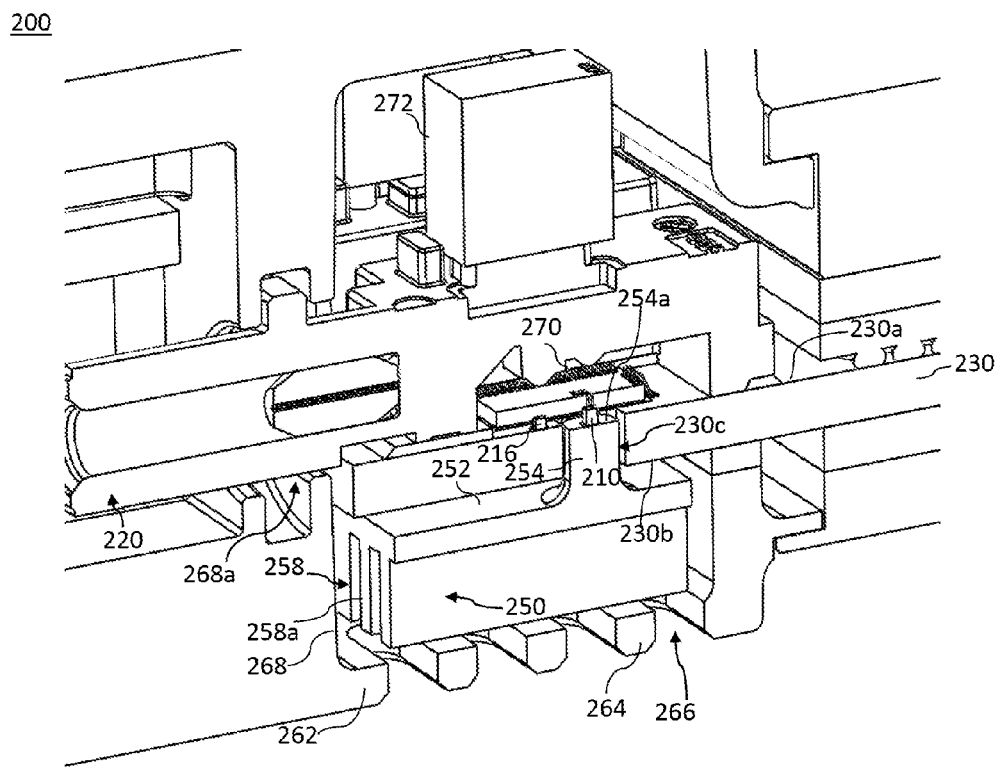
FIG. 2C illustrates a partial perspective sectional view of the fiber optic transceiver in FIG. 2B.

Referring to FIGS. 2A-2C, the fiber optic transceiver 200 that may comprise an optical end 201 and an electrical end 202 is depicted. The optical end 201 may comprise a receptacle 220 and the electrical end 202 may comprise a plurality of electrical traces 204. The optical end 201 may be configured to receive a fiber optic connector (not shown). The electrical end 202 may be coupled to a host circuit board (not shown).

The fiber optic transceiver 200 may further comprise a heat dissipating structure 250, an optical filter 272, an optical element 270, a substrate 230, a light source 210, a first metal wall 262, and a wall 268. All components of the fiber optic transceiver 200 that are in common with the fiber optic transceiver 100 may share similar characteristics or may be identical.

Referring to FIG. 2B-2C, the heat dissipating structure 250 may be disposed proximate to the optical end 201. The light source 210 may be disposed proximate to the optical end 201 to reduce optical loss between the light source 210 and the receptacle 220. The heat dissipating structure 250 may be utilized to dissipate heat from the light source 210. Therefore, the heat dissipating structure 250 is placed near to the optical end 201 of the fiber optic transceiver 200. The heat dissipating structure 250 may be interposed between a second surface 230b of the substrate 230 and the first metal wall 262. The heat dissipating structure 250 may comprise a major surface 252, a projecting member 254, and a plurality of fins 258. The heat dissipating structure 250 may be integrally formed. The major surface 252 of the heat dissipating structure 250 may be extending parallel to the second surface 230b of the substrate 230.

The projecting member 254 may be extending through a hole 230c of the substrate 230 from the second surface 230b to a first surface 230a of the substrate 230. The plurality of fins 258 may be projecting from the major surface 252 of the heat dissipating structure 250 towards the first metal wall 262. The first metal wall 262 may comprise a plurality of ribs 264. The plurality of ribs 264 may be separated by air vents 266.

The wall 268 may be projecting from the first metal wall 262 towards the substrate 230. The wall 268 may comprise an opening 268a. The receptacle 220 may be disposed on the opening 268a of the wall 268. At least one surface 258a of the plurality of fins 258 that extends orthogonally from the major surface 252 may be disposed approximating the wall 268. The at least one surface 258a of the plurality of fins 258 may be substantially parallel to the wall 268.

The light source 210 may be optically coupled with the receptacle 220. The light source 210 may be disposed on the projecting member 254 adjacent to the first surface 230a of the substrate 230. The projecting member 254 may comprise a mounting surface 254a. The mounting surface 254a of the projecting member 254 may be substantially parallel to the first surface 230a of the substrate 230. The light source 210 may be placed on the mounting surface 254a. The projecting member 254 may be physically separated from the substrate 230 so as to prevent heat transfer from the substrate 230 to the projecting member 254 and the light source 210.

The optical filter 272 and the optical element 270 may be optically coupled with the receptacle 220. The light source 210 may be disposed between the optical filter 272 and the projecting member 254 of the heat dissipating structure 250. In one embodiment, the fiber optic transceiver 200 may be a bidirectional fiber optic transceiver 200. In the bidirectional fiber optic transceiver, outgoing light transmitted from the light source 210 and incoming light detected by the photo detector 216 are travelling in a single optical fiber (not shown). The incoming light and outgoing light may have a different wavelength. The optical filter 272 may be a wavelength selective beam splitter. The wavelength selective beam splitter may be configured to separate the incoming and outgoing light based on the differences in wavelength.

Referring to FIGS. 3A-3E, a fiber optic transceiver 300 with a heat dissipating structure 350 is depicted. The fiber optic transceiver 300 may comprise a controller 380, a substrate 330, a first metal wall 362, a second metal wall 365, a wall 368, a first photo detector 314, a second photo detector 316, a driver circuit 312, and a detector circuit 318. All the components of the fiber optic transceiver 300 that are in common with the fiber optic transceiver 100, 200 may share similar characteristics or may be identical.

Figure 3A:
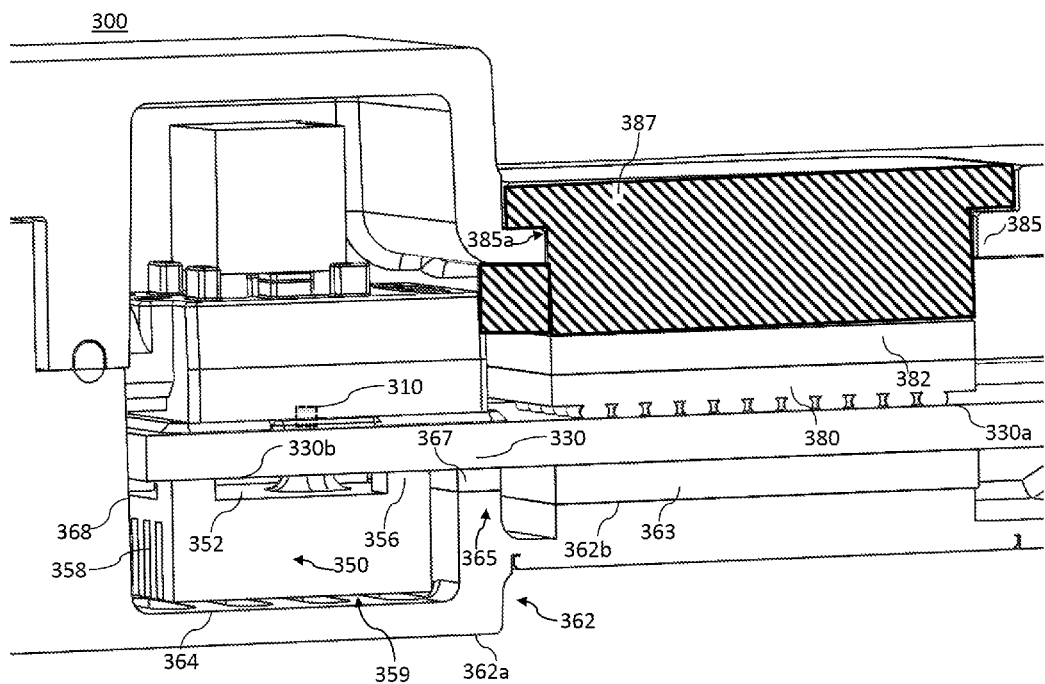
FIG. 3A illustrates a perspective sectional view of a fiber optic transceiver with a heat dissipating structure.

Referring to FIG. 3A, the heat dissipating structure 350 may comprise a plurality of fins 358, a major surface 352 and a plurality of insulating protrusions 356. The plurality of fins 358 may be separated by gaps 359 from a plurality of ribs 364 of the first metal wall 362. The first metal wall 362 may be facing the second surface 330b of the substrate 330.

The first metal wall 362 may comprise a first surface 362a and a second surface 362b adjacent to the first surface 362a. The second surface 362b of the first metal wall 362 may be disposed proximate to the second surface 330b of the substrate 330 than the first surface 362a of the first metal wall 362.

The controller 380 may be disposed on the first surface 330a of the substrate 330. The second surface 362b of the first metal wall 362 may be disposed approximating the controller 380. The fiber optic transceiver 300 may further comprise a first thermal pad 363. The first thermal pad 363 may be interposed between the second surface 330b of the substrate 330 and the second surface 362b of the first metal wall 362. The first thermal pad 363 may be thermally conductive. The first thermal pad 363 may be configured to transfer heat from the controller 380 to the first metal wall 362.

The first metal wall 362 may comprise a second metal wall 365. The second metal wall 365 may be projecting from the first metal wall 362 to the second surface 330b of the substrate 330. The second metal wall 365 may be disposed between the plurality of fins 358 and the first thermal pad 363. The fiber optic transceiver 300 may further comprise a second thermal pad 367. The second thermal pad 367 may be disposed between the second metal wall 365 and the second surface 330b of the substrate 330. The second thermal pad 367 and the second metal wall 365 may be configured to reduce heat generated by the controller 380 travelling through the substrate 330 from reaching the light source 310. The heat dissipating structure 350 may be surrounded by the second metal wall 365, the wall 368, the substrate 330 and the first metal wall 362.

The fiber optic transceiver 300 may further comprise a third metal wall 385 and a heat dissipating block 387. The third metal wall 385 may face the first surface 330a of the substrate 330. The third metal wall 385 may comprise an opening 385a. The opening 385a of the third metal wall 385 may be opposite to the controller 380. The heat dissipating block 387 may be disposed on the opening 385a of the third metal wall 385. The heat dissipating block 387 may extend from the opening 385a towards the controller 380.

The heat dissipating block 387 may be made from different material from the third metal wall 385. The third metal wall 385 may be made from zinc. The heat dissipating block 387 may be made from copper or aluminum or other materials with higher thermal conductivity than zinc, which is approximately 116 W/mK. The heat dissipating block 387 may be configured to dissipate heat from the controller 380 to the third metal wall 385. The fiber optic transceiver 300 may further comprise a third thermal pad 382. The third thermal pad 382 may be disposed between the controller 380 and the heat dissipating block 387. The third thermal pad 382 may be configured to provide a direct thermal path between the controller 380 and the heat dissipating block 387 while reducing the pressure from the weight of the heat dissipating block 387 on the controller 380.

Figure 3B:
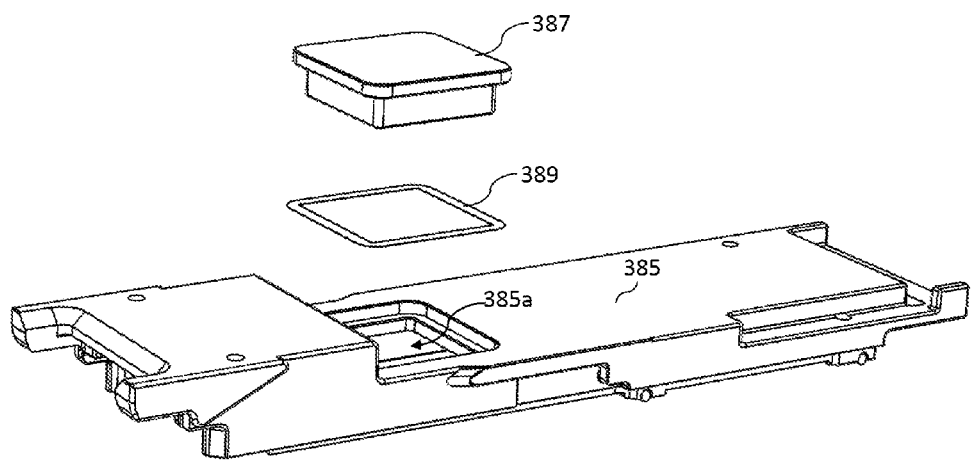
FIG. 3B illustrates an exploded view of a metal wall of the fiber optic transceiver shown in FIG. 3A.
Figure 3C:
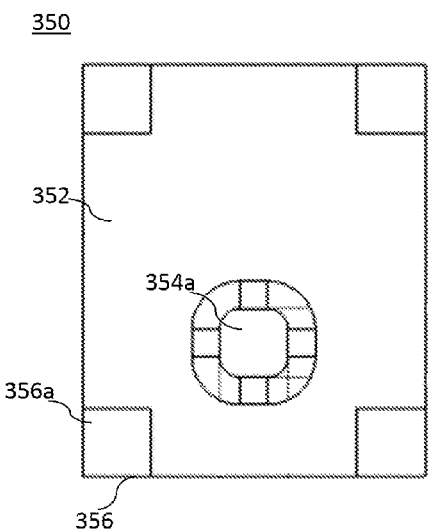
FIG. 3C illustrates a top view of a heat dissipating structure of the fiber optic transceiver.

Referring to FIG. 3B, the heat dissipating block 387 may be coupled to the opening 385a of the third metal wall 385 by using an attachment member 389. Referring to FIGS. 3A and 3C, the plurality of insulating protrusions 356 of the heat dissipating structure 350 may comprise a plurality of faces 356a substantially parallel to the major surface 352 of the heat dissipating structure 350. The plurality of faces 356a of the plurality of insulating protrusions 356 may be attached with an attachment member (not shown) to the substrate 330.

The major surface 352 of the heat dissipating structure 350 may be approximately 20 to 45 times larger than one of the plurality of faces 356a of the plurality of insulating protrusions 356. When the size of the plurality of faces 356a is smaller by more than 45 times from the major surface 352 of the heat dissipating structure 350, the amount of thermal cross talk from the substrate 330 to the heat dissipating structure 350 may be minimal. However, the contact area between the heat dissipating structure 350 and the substrate 330 may also be minimal and may cause the heat dissipating structure 350 to be detached from the substrate 330. By having one of the plurality of faces 356a of the plurality of insulating protrusions 356 20 to 45 times smaller than the major surface 352 of the heat dissipating structure 350, the heat dissipating structure 350 may be coupled to the substrate 330 with sufficient contact area while in the same time reducing the thermal cross talk between the substrate 330 and the heat dissipating structure 350.

The projecting member 354 may comprise a mounting surface 354a. The mounting surface 354a may be parallel to the major surface 352 of the heat dissipating structure 350. The light source 310 may be disposed on the mounting surface 354a of the projecting member 354.

Figure 3D:
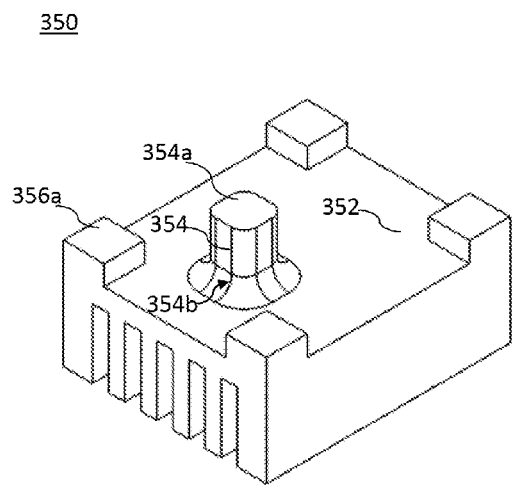
FIG. 3D illustrates a perspective view of the heat dissipating structure shown in FIG. 3C.

Referring to FIG. 3D, the heat dissipating structure 350 may comprise an intersection 354b between the projecting member 354 and the major surface 352 of the substrate 330. The intersection 354b may be a curved surface. The curved surface of the intersection 354b may be advantageous to prevent heat concentration on the intersection between 354b and the major surface 352 so as to allow better heat dissipation from the projecting member 354 to the plurality of fins 358.

Figure 3E:
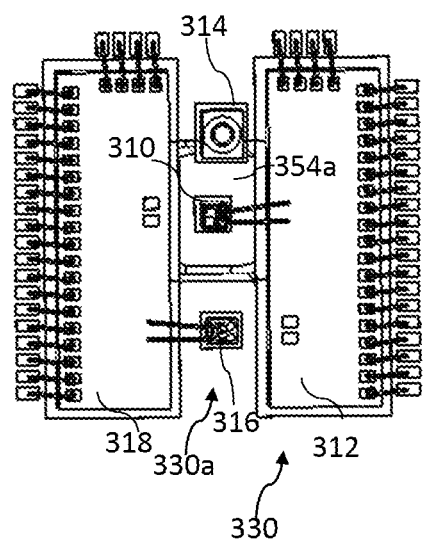
FIG. 3E illustrates a top view of a light source and photo detectors of the fiber optic transceiver shown in FIG. 3A.

FIG. 3E illustrates a partial top view of an embodiment of the fiber optic transceiver 300. The fiber optic transceiver 300 may be a bidirectional fiber optic transceiver. In this embodiment, the first and second photo detectors 314, 316, the driver circuit 312 and the detector circuit 318 may be disposed on the first surface 330a of the substrate 330. The mounting surface 354a of the projecting member 354 may be surrounded by the first and second photo detectors 314, 316, the driver circuit 312 and the detector circuit 318.

The first photo detector 314 may be a monitoring photo diode. The first photo detector 314 may be optically coupled with the light source 310 and may be electrically coupled with the driver circuit 312. The first photo detector 314 may be configured to monitor output from the light source 310 and may be configured to communicate the information to the driver circuit 312 in order for the light source 310 to produce a stable output light.

The second photo detector 316 may be configured to detect light received from an optical fiber (not shown) for data communication purposes. The second photo detector 316 may be configured to generate electrical signal from the light detected. The detector circuit 318 may be configured to amplify the electrical signal generated by the second photo detector 316.

The controller 380 shown in FIG. 3A may be configured to control the driver circuit 312. The controller 380 may control the driver circuit 312 to provide different current to the light source 310 when there is a change in the operating condition of the fiber optic transceiver 300. For example, when temperature of the fiber optic transceiver 300 increases, the light source 310 may experience a decrease in light output. The controller 380 may be configured to receive information on the increase in the temperature and generate a control signal to the driver circuit 312 to increase the current provided to the light source 310.

Figure 4A:
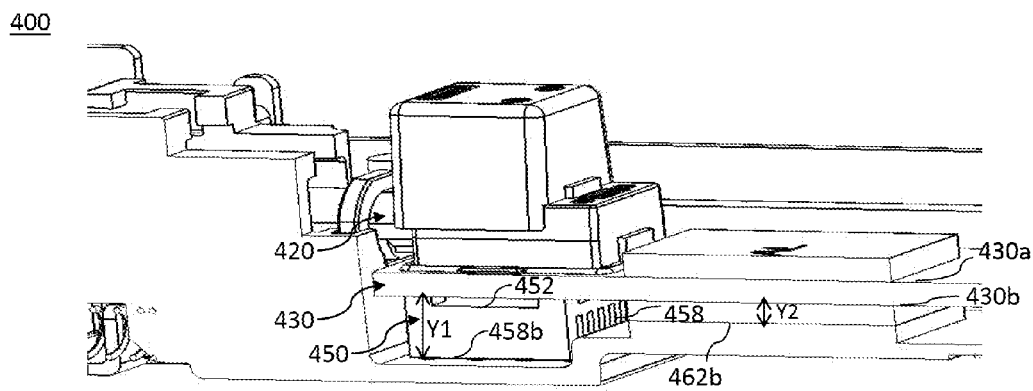
FIG. 4A illustrates a perspective sectional view of a fiber optic transceiver with a heat dissipating structure.
Figure 4B:
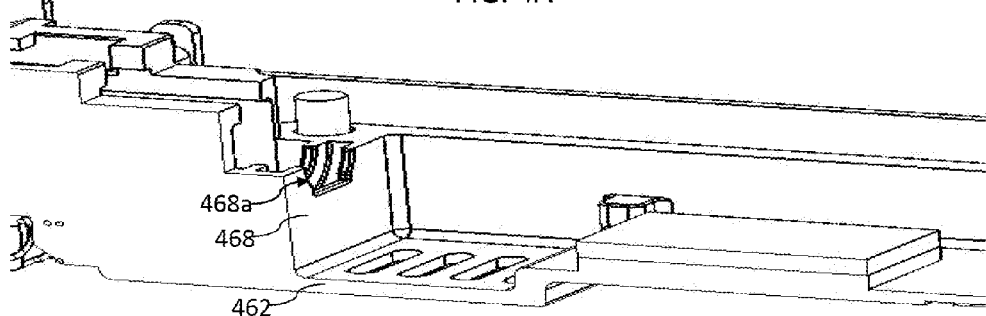
FIG. 4B illustrates a perspective sectional view of the fiber optic transceiver shown in FIG. 4A without the heat dissipating structure.

FIGS. 4A and 4B illustrate partial sectional views of a fiber optic transceiver 400. The fiber optic transceiver 400 may comprise a substrate 430, a heat dissipating structure 450, a receptacle 420, a first metal wall 462, a wall 468. All the components of the fiber optic transceiver 400 that are in common with the fiber optic transceiver 100, 200, 300 may share similar characteristics or may be identical.

The wall 468 may comprise an opening 468a adjacent to a first surface 430a of the substrate 430. The receptacle 420 may be disposed in the opening 468a of the wall 468. The heat dissipating structure 450 may comprise a plurality of fins 458. The plurality of fins 458 may comprise at least one surface 458b of the plurality of fins 458 that extends parallel to the major surface 452 of the heat dissipating structure 450. The at least one surface 458b of the plurality of fins 458 may be separated by a first distance Y1 from the second surface 430b of the substrate 430. The first metal wall 462 may comprise a second surface 462b. The second surface 462b of the first metal wall 462 may be disposed at a second distance Y2 from the second surface 430b of the substrate 430. The first distance Y1 may be larger than the second distance Y2.

Figure 5:
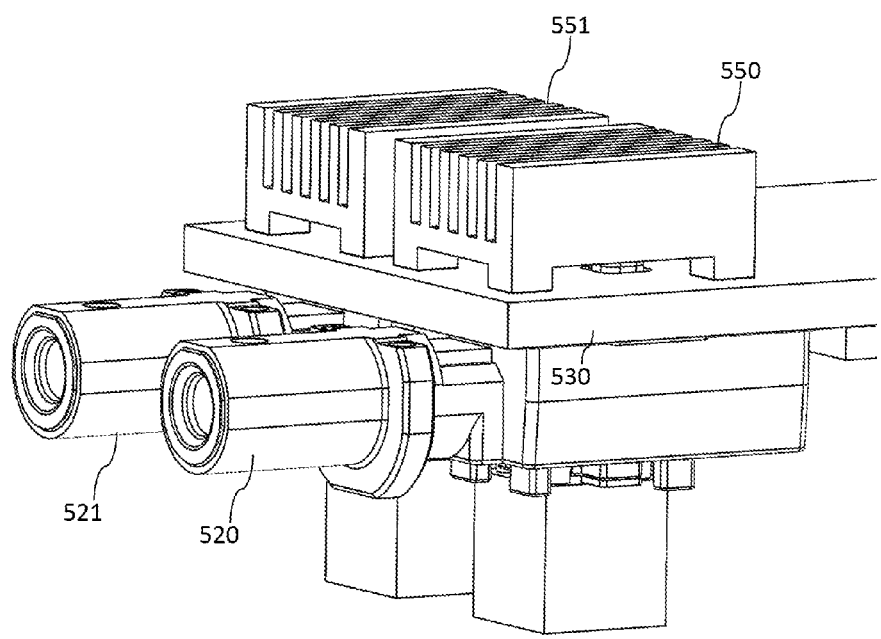
FIG. 5 illustrates a perspective view of a fiber optic transceiver with a pair of heat dissipating structures.

Referring to FIG. 5, a fiber optic transceiver 500 having first and second heat dissipating structures 550, 551 is depicted. The fiber optic transceiver 500 may comprise first and second receptacles 520, 521 and a substrate 530. All the components of the fiber optic transceiver 500 that are in common with the fiber optic transceiver 100, 200, 300, 400 may share similar characteristics or may be identical.

The first and second heat dissipating structures 550, 551 may be disposed on the same substrate 530. In one embodiment, the first receptacle 520 may be configured to receive an optical signal from an optical fiber (not shown) and the second receptacle 521 may be configured to deliver an optical signal to another optical fiber (not shown).

Referring to FIGS. 6A-6D, an optical communication system 698 comprising a fiber optic transceiver 600 and a cage 609 is depicted. The fiber optic transceiver 600 may comprise a housing 660, an optical port 606, a substrate 630, a heat dissipating surface 652, a plurality of heat dissipating extensions 658, a heat dissipating projection 654, a heat dissipating block 687, a controller 680, and a light source 610. All the components of the fiber optic transceiver 600 that are in common with the fiber optic transceiver 100, 200, 300, 400, 500 may share similar characteristics or may be identical.

Figure 6A:
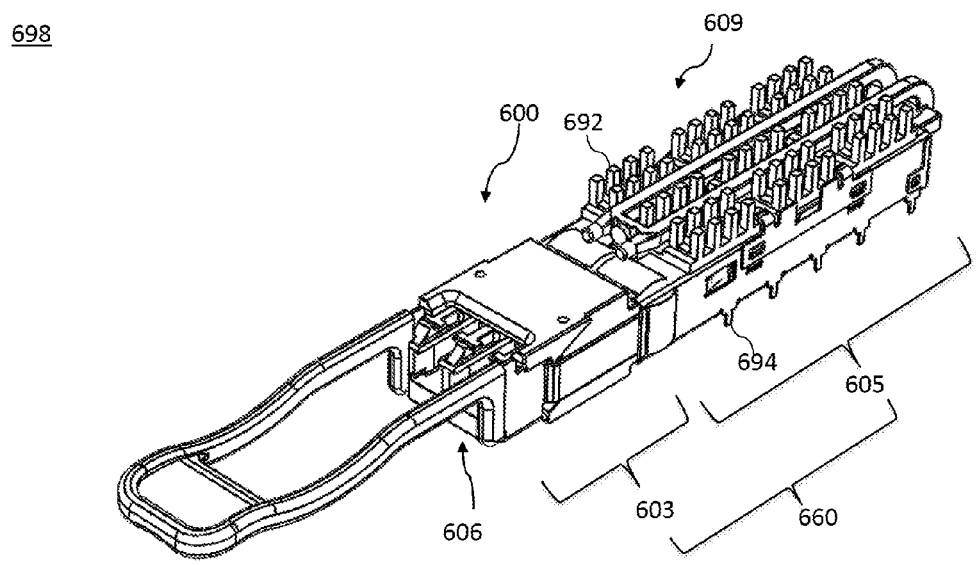
FIG. 6A illustrates a perspective view of an optical communication system having a cage and a fiber optic transceiver.

Referring to FIG. 6A, the housing 660 may comprise a first region 603 and a second region 605. The optical port 606 may be disposed at the first region 603. The cage 609 may be configured to substantially enclose the second region 605 of the housing 660. The cage 609 may comprise a plurality of cage pins 694 and a plurality of heat dissipating pins 692. The plurality of cage pins 694 may be configured to secure the cage 609 to a host circuit board (not shown).

Figure 6B:
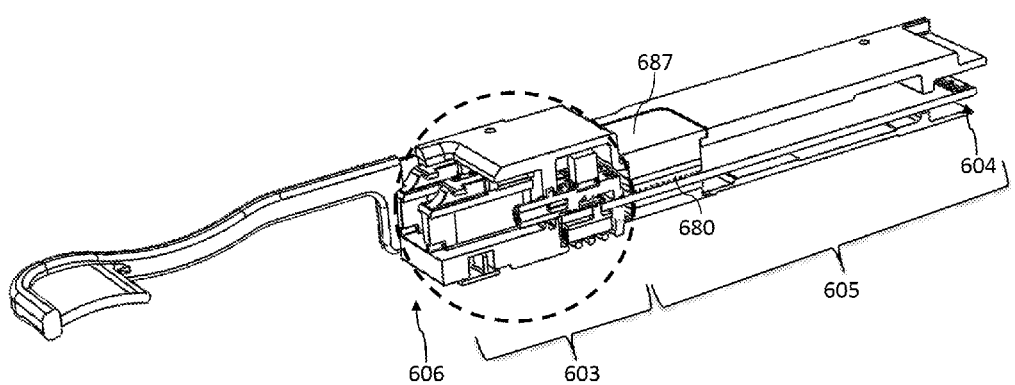
FIG. 6B illustrates a perspective sectional view of the optical communication system shown in FIG. 6A.

Referring to FIG. 6B, a plurality of electrical contacts 604 may be disposed on the substrate 630 at the second region 605 of the housing 660. The heat dissipating block 687 and the controller 680 may be disposed at the second region 605 of the housing 660. The heat dissipating block 687 and the controller 680 may be disposed proximate to the optical port 606 but distanced away from the plurality of electrical contacts 604.

Figure 6C:
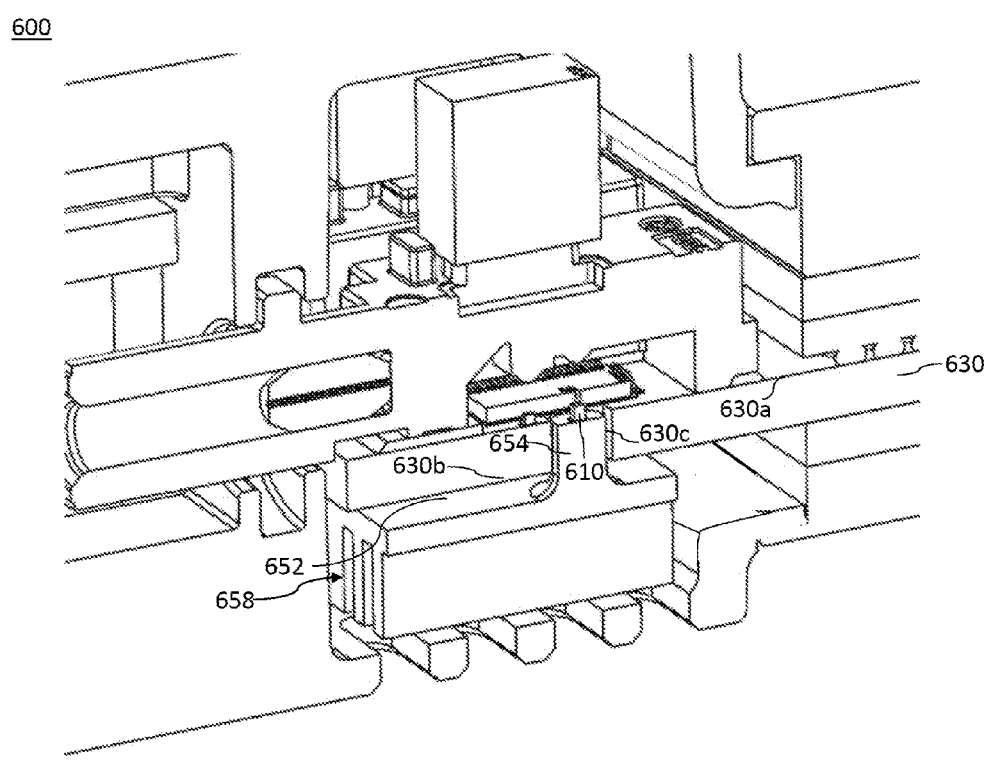
FIG. 6C illustrates a partial perspective sectional view of the optical communication system shown in FIG. 6B.

Referring to FIGS. 6B-6C, the substrate 630 may be disposed within the housing 660. The substrate 630 may extend from the first region 603 to the second region 605 of the housing 660. The substrate 630 may comprise an opening 630c. The opening 630c may extend from the first surface 630a to the second surface 630b of the substrate 630. The heat dissipating surface 652 may be disposed adjacent to the second surface 630b of the substrate 630 at the first region 603 of the housing 660. The plurality of heat dissipating extensions 658 may comprise a plurality of heat dissipating fins. The plurality of heat dissipating extensions 658 may project from the heat dissipating surface 652 away from the substrate 630.

The heat dissipating projection 654 may extend perpendicularly from the heat dissipating surface 652 to the first surface 630a of the substrate 630 through the opening 630c of the substrate 630. The light source 610 may be disposed on the heat dissipating projection 654 proximate to the first surface 630a of the substrate 630. The light source 610 may be optically coupled with the optical port 606.

Figure 6D:
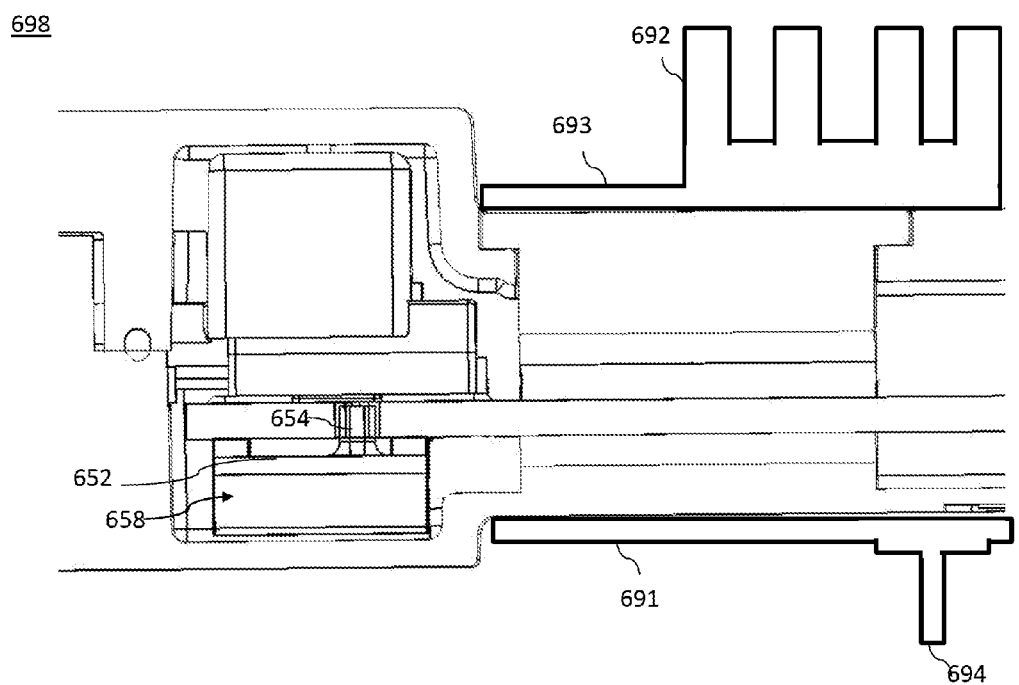
FIG. 6D illustrates a cross sectional view of the optical communication system shown in FIG. 6A.

Referring to FIGS. 6B and 6D, the cage 609 may comprise a first metal surface 691 and a second metal surface 693. The heat dissipating projection 654 may extend from the heat dissipating surface 652 in a first direction. The plurality of cage pins 694 may project from the first metal surface 691 in a direction opposite to the first direction. The plurality of heat dissipating extensions 658 may be projecting from the heat dissipating surface 652 in a second direction. The plurality of heat dissipating pins 692 may be projecting from the second metal surface 693 in a direction opposite to the second direction.

Different aspects, embodiments or implementations may, but need not, yield one or more of the advantages. For example, by having one of the plurality of faces of the plurality of insulating protrusions 20 to 45 times smaller than the major surface of the heat dissipating structure, the heat dissipating structure may be coupled to the substrate with sufficient contact area while in the same time reducing the thermal cross talk between the substrate and the heat dissipating structure.

Although specific embodiments of the invention have been described and illustrated herein above, the invention should not be limited to any specific forms or arrangements of parts so described and illustrated. For example, the fiber optic transceiver described above may be a single mode fiber optic transceiver, a multi mode fiber optic transceiver, a wavelength division multiplexing fiber optic transceiver or any other types of fiber optic transceiver. The scope of the invention is to be defined by the claims.

What is claimed is:

1. A fiber optic transceiver, comprising:
   a substrate having a hole extending therethrough;
   a heat dissipating structure coupled to the substrate, the heat dissipating structure comprising:
      a major surface;
      a plurality of fins projecting from the major surface of the heat dissipating structure away from the substrate;
      a projecting member extending at least partially through the hole of the substrate;
      a plurality of insulating protrusions extending substantially perpendicularly from the major surface of the heat dissipating structure and coupled to the substrate, the plurality of insulating protrusions configured to separate the major surface of the heat dissipating structure with the substrate so as to reduce heat transfer between the substrate and the heat dissipating structure;
   a receptacle disposed adjacent to the substrate and configured to receive a fiber optic connector; and
   a light source optically coupled with the receptacle and disposed on the projecting member of the heat dissipating structure.

2. The fiber optic transceiver of claim 1, wherein the plurality of insulating protrusions are coupled to the substrate with a thermally insulating attachment member.

3. The fiber optic transceiver of claim 1, wherein:
   the plurality of the insulating protrusions of the heat dissipating structure comprises a plurality of faces substantially parallel to the major surface of the heat dissipating structure; and
   the major surface of the heat dissipating structure is approximately 20 to 45 times larger than one of the plurality of faces of the plurality of the insulating protrusions.

4. The fiber optic transceiver of claim 1, wherein:
   the substrate comprises a first surface and a second surface opposite the first surface; and
   the major surface of the heat dissipating structure is disposed parallel to the second surface of the substrate.

5. The fiber optic transceiver of claim 4 further comprising a first metal wall facing the second surface of the substrate, wherein:
   the first metal wall comprises a plurality of ribs; and
   each of the plurality of ribs is distanced apart from one another so as to create air vents on the first metal wall.

6. The fiber optic transceiver of claim 5, wherein the plurality of fins are separated by gaps from the plurality of ribs of the first metal wall.

7. The fiber optic transceiver of claim 4, wherein:
   the projecting member has a mounting surface substantially parallel to the major surface of the heat dissipating structure; and
   the light source is disposed on the mounting surface of the projecting member.

8. The fiber optic transceiver of claim 7 further comprising first and second photo detectors, a driver circuit and a detector circuit, wherein the mounting surface of the projecting member is surrounded by the first and second photo detectors, the driver circuit and the detector circuit.

9. The fiber optic transceiver of claim 1, wherein the heat dissipating structure comprises an intersection between the projecting member and the major surface of the heat dissipating structure, and the intersection is a curved surface.

10. The fiber optic transceiver of claim 1, further comprising an optical filter optically coupled with the receptacle, wherein the light source is disposed between the optical filter and the projecting member of the heat dissipating structure.

11. The fiber optic transceiver of claim 1, wherein the heat dissipating structure is integrally formed.

12. A fiber optic transceiver, comprising:
a substrate having a first surface and a second surface opposite the first surface, the substrate having a hole extending through from the first surface to the second surface;
a first metal wall facing the second surface of the substrate;
a wall projecting from the first metal wall towards the substrate, the wall having an opening adjacent to the first surface of the substrate;
a receptacle disposed in the opening of the wall;
a heat dissipating structure interposed between the second surface of the substrate and the first metal wall, the heat dissipating structure having at least:
a major surface extending parallel to the second surface of the substrate;
a projecting member extending through the hole from the second surface to the first surface of the substrate;
a plurality of fins projecting from the major surface of the heat dissipating structure towards the first metal wall;
at least one surface of the plurality of fins extending orthogonally from the major surface disposed approximating the wall; and
a light source optically coupled with the receptacle and disposed on the projecting member of the heat dissipating structure adjacent to the first surface of the substrate.

13. The fiber optic transceiver of claim 12, wherein the first metal wall comprises a first surface and a second surface adjacent to the first surface, the second surface of the first metal wall is disposed proximate to the second surface of the substrate than the first surface of the metal wall.

14. The fiber optic transceiver of claim 13 further comprising a first thermal pad, wherein the first thermal pad is interposed between the second surface of the substrate and the second surface of the first metal wall.

15. The fiber optic transceiver of claim 14 further comprising a controller, wherein:
the second surface of the first metal wall is disposed approximating to the controller; and
the first metal wall comprises a second metal wall projecting from the first metal wall to the second surface of the substrate and disposed between the plurality of fins and the first thermal pad.

16. The fiber optic transceiver of claim 15 further comprising a third metal wall and a heat dissipating block, wherein:
the third metal wall faces the first surface of the substrate;
the third metal wall has an opening opposite the controller; and
the heat dissipating block is disposed on the opening of the third metal wall and extends towards the controller.

17. The fiber optic transceiver of claim 13, wherein:
at least one surface of the plurality of fins extends parallel to the major surface of the heat dissipating structure is separated by a first distance from the second surface of the substrate;
the second surface of the first metal wall is disposed at a second distance from the second surface of the substrate; and
the first distance is larger than the second distance.

18. An optical communication system, comprising:
a fiber optic transceiver having at least:
a housing;
a first region and a second region of the housing;
an optical port disposed at the first region of the housing and configured to receive a fiber optic connector;
a substrate disposed within the housing and extending from the first region to the second region of the housing;
first and second surfaces of the substrate, the substrate having an opening extending from the first surface to the second surface of the substrate;
a plurality of electrical contacts disposed on the substrate at the second region of the housing;
a heat dissipating surface disposed adjacent to the second surface of the substrate at the first region of the housing;
a plurality of heat dissipating extensions projecting from the heat dissipating surface away from the substrate;
a heat dissipating projection extending perpendicularly from the heat dissipating surface to the first surface of the substrate through the opening of the substrate;
a light source disposed on the heat dissipating projection proximate to the first surface of the substrate, the light source optically coupled with the optical port; and
a cage configured to substantially enclose the second region of the housing.

19. The optical communication system of claim 18, wherein:
the cage comprises a first metal surface and a plurality of cage pins;
the plurality of cage pins are configured to secure the cage to a host circuit board;
the heat dissipating projection extends from the heat dissipating surface in a first direction; and
the plurality of cage pins are projecting from the first metal surface in a direction opposite to the first direction.

20. The optical communication system of claim 19, wherein:
the cage comprises a second metal surface facing the first metal surface and a plurality of heat dissipating pins;
the plurality of heat dissipating extensions projecting from the heat dissipating surface in a second direction; and
the plurality of heat dissipating pins projecting from the second metal surface in a direction opposite to the second direction.

* * * * *